March 11, 1969 J. FOUFOUNIS 3,432,171

PHONOGRAPH TONE ARM AND MOUNTING

Filed Nov. 13, 1967

United States Patent Office 3,432,171
Patented Mar. 11, 1969

3,432,171
PHONOGRAPH TONE ARM AND MOUNTING
Jean Foufounis, 27 Chemin du Chene 1020, Renens Vaud, Switzerland
Continuation-in-part of application Ser. No. 476,364, Aug. 2, 1965. This application Nov. 13, 1967, Ser. No. 687,412
U.S. Cl. 274—23 4 Claims
Int. Cl. G11b 3/16

ABSTRACT OF THE DISCLOSURE

A tone arm pivoted at one end on a first shaft perpendicular to the plane of rotation of the record. The playing head has a pair of needles each projecting from opposite sides of the head for alternative use. The tone arm is bent in at least one point of its length in order to form two segments lying in the same plane, the segments of the arm in the vicinity of the shaft extending outside the circumference of the disc regardless of the functioning position of the arm while the other segment of the arm carrying the playing head extends substantially in the direction of the centre of the record.

This application is a continuation-in-part of my previous application Ser. No. 476,364 of Aug. 2, 1965.

Heretofore it has been the practice in pick-ups in order to prevent the arm from coming in contact with the edge of the record to be played to give it a relatively great length, which considerably increases the dimensions of the box in which the pick-up was mounted. For this reason this type of pick-up has only been used in non-transportable devices such as for example prepayment record players.

The object of this invention is to provide a pick-up having an arm provided with a playing head having needles projecting on opposite sides thereof, the first being intended for playing one side of the disc or record and the second for playing the other side, according to whether the arm is swung on one or the other side of the record, the arm being so shaped as to permit such swinging action without coming into contact with the edge of the record and without the arm assuming the considerable length heretofore thought essential.

The accompanying drawing is a diagrammatic representation by way of example of one embodiment of the object of the present invention.

Figure 1:
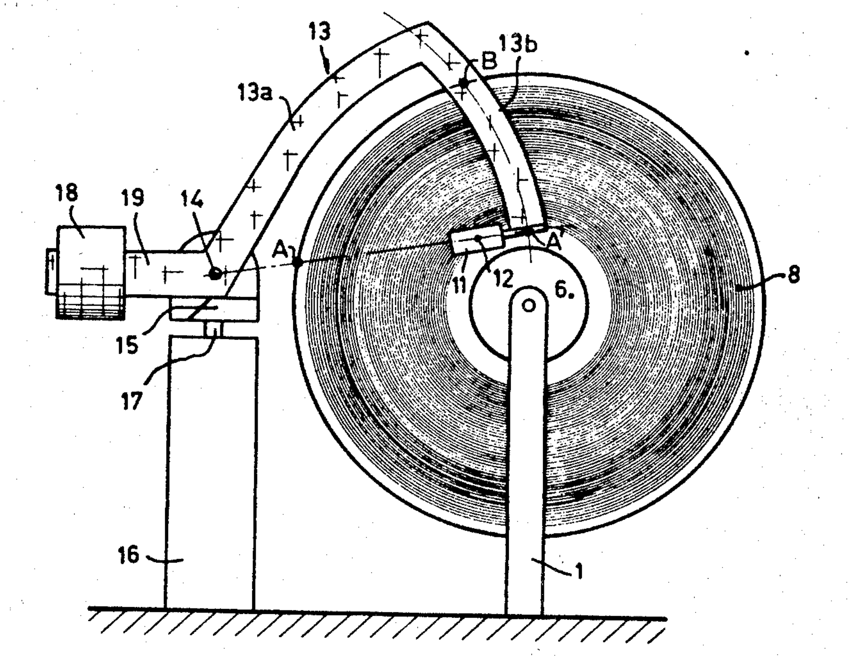
FIGURE 1 is a side elevation.

The apparatus shown in the drawing (FIGURES 1 and 2) has two vertical pillars 1 and 2 projecting in parallel on a base 3, respectively supporting horizontal shafts 4, 5 which are axially in line. These shafts each carry a plate; 6 on shaft 4, and 7 on shaft 5; movable, by means not shown, towards each other sufficiently to grip a disc 8 of which one side or the other is to be played and to rotate this disc. This disc can actually be introduced between said plates by a device (not shown) which takes it from a store (also not shown); this same device restores the disc to the store when the playing is finished.

Rotation of the disc is controlled by a pulley 9 which is keyed to the end of shaft 5, and which is driven by a belt 10 from a motor-driven pulley (not shown). This drive is performed for example, through a speed-changer which makes it possible to rotate the disc 8 at 33⅓ or 45 revolutions in either direction, according to the side which is to be played.

The pick-up shown actually has a reading-head 11 provided with two needles 12, projecting on opposite sides of said head, one being intended for reading one side of the disc and the other for the other side, provided, of course, that the head has been brought to the appropriate side of said disc. For this purpose the head 11 is mounted on the end of an arm 13 between two lugs **15*a* and 15*b* in a turret 15, which is horizontally pivoted on a support 16 by means of a shaft 17 extending vertically in the median plane of the disc 8. The weight of the arm 13 and the head 11 carried thereby is balanced by a counterpoise 18 fixed to the end of a support 19 integral with the arm 13. In this way when no pressure is exerted thereon and one of the needles 12 is engaged in the groove of the corresponding surface of the disc said arm will swing clockwise, with the needle 12** exerting very little force upon the edges of the groove.

As shown in FIGURE 1, the arm 13 is bent and comprises two curved parts, one of which, **13*a*, is mounted on the shaft 14, while the other, 13*b*, carries the head 11**.

The centre of curvature of the part **13*a* coincides with the centre of disc 8 when the arm is in its limiting angular position in which the reading needle 12 is engaged in the terminal portion of the spiral groove: moreover, the length of this portion 13*a* is such that the bend of the arm is separated from the pivotal shaft 14 by a distance substantially equal to the distance between said shaft 14 and the pivotal axis of the disc 8**.

The centre of curvature of the portion **13*b* coincides with the shaft 14: moreover the length of said portion 13*b* is such that when one of the needles 12 of the head 11 is engaged in the terminal portion of the groove of the corresponding surface of the disc, the part 13*a* of the arm 13 is still outside the outer edge of the disc 8**, as shown in FIGURE 1.

A mechanism (not shown) makes it possible to read the two surfaces of a disc 8 in turn. In the position shown in the drawing, the front surface of the disc, FIGURE 1, has just been read. The arm 13 is then swung slightly downwards, FIGURE 2, around the shaft 17 so as to bring the needle out of the groove and then the arm is raised in an anti-clockwise direction, FIGURE 1, to swing around the shaft 14 sufficiently for the head 12 to be able to pass freely above the disc 8 by swinging the arm upwards, FIGURE 2, on the shaft 17. When the swinging is completed, the arm 13 is then shifted clockwise FIGURE 1, sufficiently for the other needle 12 to come in line with the beginning of the groove of the back surface of the disc: a last horizontal swing of said arm on shaft 17 towards the disc 8 allows the needle 12 to engage in this groove.

The use of a bent arm instead of a conventional straight arm, indicated schematically in the drawing by the chain dotted line A–A′, permits a substantial reduction of the bulk of the pick-up in the plane of the disc: actually, if the arm 13 were straight, since the shaft 17 is in the median plane of the disc 18, it would be necessary for said arm to be made relatively long in order to prevent it from coming into contact at A with the edge of the disc. In fact, the longer the arm 13, the nearer the distance between the arm and the edge of the disc at A, approaches the distance between the head 12 and said disc.

With the bent arm according to the present invention, the point at which the arm 13 passes across the edge of the disc is the point B for which the distance between the arm and the disc is substantially equal to that between the head 11 and said disc. It is therefore clear that the use of a bent arm makes it possible to achieve what could only be done with a straight arm of a length substantially equal to the distance between 14 and A′ plus the distance, A–A′. The distance A–A′ substantially corresponds to the reduction obtained in the bulk of the device.

In another embodiment (not shown) the pick-up may be provided with an arm also bent at a second point of its length: thus said arm could comprise a straight portion by which it should be fixed to the shaft 14 and extending from said shaft towards the pivotal shaft of disc 8, the end of said straight portion extending a short distance from the edge of the disc and having a bent segment of a shape corresponding to portions 13*a* and 13*b* of the arm 13 shown in FIGURE 1.

Figure 2:
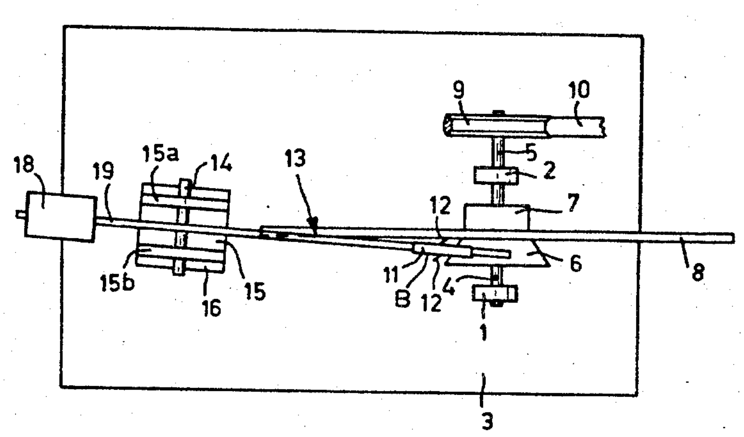
FIGURE 2 is a plan view.

This type of arm consists of a combination of the conventional straight arm and the bent arm of FIGURES 1 and 2: in particular it makes it possible to remove even further away the point at which the arm passes across the edge of the disc, particularly so as to be able to read even very distorted discs.

Of course, the invention is not restricted to what is shown or described in the drawing, in particular it will be understood that a pick-up of the type described can be incorporated in record players of all kinds particularly those of the prepayment type, radio sets or portable apparatus, which do not employ a turntable.

What is claimed is:

1. In a portable phonograph pick-up, means for maintaining in a plane by its central part a record having sound recordings on both sides thereof; means for rotating said record in a different direction according to the side thereof to be played; a support, a first shaft, lying substantially within the said plane of said record; a turret member pivoted on said support by said first shaft; a second shaft on said turret substantially perpendicular to said plane of said record; a two-ended arm carrying a single reading head; said reading head having a pair of needles projecting on opposite sides thereof, said needles being adapted to be brought in contact with one or the other of said sides of said record by a corresponding pivoting movement of said arm about said first shaft; said arm being bent on at least one point of its length so as to form two segments lying in the same plane, one of said segments having one extremity pivoted on said second shaft and extending outside the periphery of said record regardless of the position of said shaft, the other extremity of said one segment being connected to one extremity of said other segment, said other segment extending substantially toward said central part of said record and carrying said reading head at the other extremity thereof; the point at which said arm is bent being distant from said second shaft by a length, subtantially equal to the distance between said shaft and said center of said record.

2. Pick-up as claimed in claim 1, wherein the part of the arm carrying said head is in the shape of an arc of a circle centered on said second shaft of said arm.

3. Pick-up according to claim 1, wherein the part of the arm pivoteed on said second shaft forms a segment of a circle substantially centered upon the center of the record when said arm is in its extreme angular position in which the needle cooperates with the inner end of said record.

4. Pick-up according to claim 1, wherein said arm is bent at a second point on its part pivoted on said first shaft, said part having two sections, a straight section extending from said shaft as far as the periphery of said record and a curved section extending along said periphery.

References Cited

UNITED STATES PATENTS

| | | |
|---|---|---|
| 1,377,027 | 5/1921 | Pettit. |
| 2,323,365 | 7/1943 | Andrews. |
| 2,719,720 | 10/1955 | Rockola. |

FOREIGN PATENTS

| | | |
|---|---|---|
| 812,532 | 4/1959 | Great Britain. |

HARRY N. HAROIAN, *Primary Examiner.*

U.S. Cl. X.R.

274—9